(12) United States Patent
Nohara

(10) Patent No.: US 11,733,374 B2
(45) Date of Patent: Aug. 22, 2023

(54) RADAR SYSTEM DEVICE AND METHOD FOR CORROBORATING HUMAN REPORTS ON HIGH-RISK, SEARCH AND RESPONSE INCIDENTS

(71) Applicant: ACCIPITER RADAR TECHNOLOGIES INC., Fenwick (CA)

(72) Inventor: Timothy J. Nohara, Fonthill (CA)

(73) Assignee: ACCIPITER RADAR TECHNOLOGIES INC., Fonthill (CA)

( * ) Notice: Subject to any disclaimer, the term of this patent is extended or adjusted under 35 U.S.C. 154(b) by 140 days.

(21) Appl. No.: 17/171,663

(22) Filed: Feb. 9, 2021

(65) Prior Publication Data
US 2022/0252718 A1 Aug. 11, 2022

(51) Int. Cl.
*G01S 13/91* (2006.01)
*G01S 13/87* (2006.01)
*G01S 13/72* (2006.01)

(52) U.S. Cl.
CPC .......... *G01S 13/917* (2019.05); *G01S 13/726* (2013.01); *G01S 13/878* (2013.01)

(58) Field of Classification Search
CPC .... G01S 13/917; G01S 13/726; G01S 13/878; G01S 7/003; G01S 13/86; G01S 13/765
See application file for complete search history.

(56) References Cited

U.S. PATENT DOCUMENTS

| 6,249,241 | B1* | 6/2001 | Jordan | G01S 13/917 342/41 |
| 7,624,080 | B1* | 11/2009 | Morales | G06N 5/02 706/22 |
| 2016/0292932 | A1* | 10/2016 | Gremmert | G08G 5/0013 |
| 2017/0067996 | A1* | 3/2017 | Coyle | G01S 17/87 |

OTHER PUBLICATIONS

Wu, Xioa-Chao et al, "Simulation of Radar Track Data Based on Data Mining Techniques", 2013, Telkomnika Indonesian Journal of Electrical Engineering, vol. 11, No. 7, pp. 3780-3788 (Year: 2013).*
Wu, Xiao-Chao et. al., "Simulation of Radar Track Based on Data Mining Techniques" Telkomnika Indonesian Journal of Electrical Engineering, vol. 11, No. 7, pp. 3780-3788.

* cited by examiner

Primary Examiner — Timothy A Brainard
Assistant Examiner — Juliana Cross
(74) Attorney, Agent, or Firm — R. Neil Sudol; Henry D. Coleman

(57) ABSTRACT

A smart radar data mining and target location corroboration system has a target incident processing system (TIPS) and target information system (TIS) that provide corroborating radar data in response to target incident data, to assist search and response personnel in responding to high-risk safety or security incidents involving an uncooperative vessel or aircraft. The TIPS rapidly mines large volumes of historical radar track data, accessible through the TIS, to extract corroborating radar data pertinent to the target incident data. The corroborating radar data include trajectories, last known radar position (LKRP) or first known radar position (FKRP) information believed to be associated with the target incident data.

38 Claims, 3 Drawing Sheets

Corroborating Radar Data showing candidate radar tracks and LKRPs & FKRPs generated in response to target incident data Raw radar track data on West end of Lake Ontario from 1000 to 1900 on 16 May 2019

RADAR SYSTEM DEVICE AND METHOD FOR CORROBORATING HUMAN REPORTS ON HIGH-RISK, SEARCH AND RESPONSE INCIDENTS

FIELD OF THE INVENTION

This invention relates to smart radar system devices and methods that support search and rescue (SAR) operations where incident reports such as a vessel overdue are stale in time resulting in large search areas which are expensive to search, frequently resulting in the distressed vessel not being found in time for rescue by safety and security practitioners.

BACKGROUND OF THE INVENTION

Search and rescue operations, methods and practices are not new. In aviation which is highly regulated, individual passenger and cargo aircraft are monitored by air traffic controllers, airlines, and other authorities using a combination of primary radar, sensors such ADS-B (Automatic Dependent Surveillance-Broadcast), and direct communication with pilots who always know where they are because of on-board global positioning satellite (GPS) sensors. When one of these cooperative aircraft (aircraft that cooperate with authorities so that their location is virtually always known) goes missing as declared by a lost radar contact or an overdue appointment, controllers take immediate action by reporting the situation to appropriate authorities including the particular aircraft's Last Known Position (LKP) and time.

Large cargo ships (typically defined as greater than 300 tons) such as salties (i.e. ocean going ships) and lakers (i.e. fresh water ships), and passenger ships such as ferries and cruise ships are also regulated and required to be cooperative with authorities, by employing transponder sensors such as AIS (Automatic Identification System) and by pilot communication with Vessel Traffic Services (VTS) controllers when entering regulated seaports and freshwater ports. If one of these ships goes missing as indicated, for example, by a lost AIS contact, a VTS controller could take immediate action by reporting the situation to authorities such as Coast Guards.

The generalized definition of LKP used by SAR authorities is the last known position or location of a missing subject as determined by physical evidence such as a discarded object or a footprint in the case of a missing hiker. In the case of a cooperative aircraft or ship, the LKP may be the last reported point (by pilot communication, ADS-B or AIS) or the last radar position observed by the controller. For these cooperative aircraft and ships, the radar tracks are respectively fused with the cooperative ADS-B or AIS information, as the case may be, so that the radar position is precisely known for the missing subject in question. The LKP is readily available and is a key input into the search area calculation conducted by SAR professionals.

Finding a subject vessel in distress is further facilitated by emergency position-indicating radio beacons (EPIRB) and Search and Rescue radar transponders (SARTs) which are part of the Global Maritime Distress and Safety System (GMDSS). The GMDSS devices help passing ships and search vessels locate the subject in distress through terrestrial and satellite radio signals that will appear on the passing ship's radar.

If only all vessels were cooperative and carried EPIRBs and SARTs.

The vast majority of SAR incidents occur in situations involving unregulated, missing subjects such as a recreational boat or small commercial vessel who is reported overdue (i.e. the vessel didn't return to the departure point or a designated meeting point on time) by a family member, friend or associate, several hours after the subject departed from a known marina or shore location (i.e. the departure point). We refer to such subjects as an uncooperative vessel or target because it was not being monitored by a VTS controller or another authority with responsibility for tracking that particular subject vessel. In such cases, there is no up-to-date LKP. Consequently, the LKP that is injected into the search area calculation ends up being the location of the marina or shore location where the vessel was presumed to depart from several hours prior to the reporting of the SAR incident. As a result, the SAR search area ends up being extremely large due to the passage of time between the presumed LKP and the initiation of the SAR response effort. For example, a vessel traveling an average speed of 10 knots could be anywhere within an 80 nautical miles radius if eight hours had passed before the overdue was reported.

SAR incidents occurring in uncooperative target environments are not likely to decrease as disposable income grows and participation in recreational boating activities increases, including fishing, sailing, house-boating, jet skiing, et cetera. Global climate change is also opening up new areas to recreational boating and shipping traffic, such as the Arctic with the opening up of the Northwest Passage, and with longer summers.

Take for example the Great Lakes St. Lawrence Seaway Shipping System, which spans a lineal length of about 3,700 km with a bi-national border (Canada/United States) running through the middle of it. On any given summer day, there may be 10,000 pleasure-craft enjoying recreational activities while on order of 100 ships or just 1% of the traffic consists of regulated ships with AIS. And the recreational activities occur day and night. When SAR incidents occur, inevitably involving these recreational boaters, SAR professionals spring into action from a rescue coordination centre (RCC) to assess the situation, plan and respond. A single RCC in Canada and a small number in the United States are responsible for managing SAR incidents across the entire Great Lakes.

When a SAR incident is called in by the public or by an observer, a case is established that is assigned to a SAR coordinator to oversee. In the case of an overdue incident, an initial investigation may be quickly launched to improve on the information provided by the original caller. For example, local police may be dispatched to a marina or boat launch to confirm that the missing subject did in fact launch from that location (and hadn't returned) and to try to assess the approximate time of launch (to establish an LKP) and any other trip information that may have been conveyed by the subject to locals (e.g. "he said he was heading NNW to his favorite fishing hole"). This collected information will be reported promptly to the SAR coordinator. Radio calls will also be transmitted by authorities on the marine channel to inform boaters of the situation in order to solicit additional reports from the public (e.g. "we saw a vessel of that description drifting about 3 miles off the shore of Jordan Harbour around 0730 am this morning") which can assist in the search planning process. The collected information is used with drift models to calculate a DATUM, which is the most probable position of the search object, corrected for total drift, at any specific time. The DATUM may be updated over time as new information comes in. The SAR coordinator will also call on response assets as required; and may dispatch one or more search and rescue units (SRUs) based on initial LKP and DATUM information, while gathering additional information from stakeholders. Search assets include SAR station vessels, SAR auxiliary units, police marine units, and air assets, along with cooperative vessels that may be in the area.

SAR coordinators are under immense pressure to quickly establish the search area and search patterns and assign SRUs. SRUs will periodically report back their findings to update SAR planning and coordination. The more time it takes to establish the search parameters and get the search assets underway, the larger is the uncertainty associated with the DATUM. This in turn leads to the need for larger search areas which are more costly to search, and the increased risk of coming up empty handed. SAR operations are not without their own safety risks for response personnel, which increase with the size of the required search area and environmental conditions. Coming up empty-handed not only typically leads to loss of life and increased costs, but also requires a subsequent recovery operation, usually undertaken by local law enforcement (LE) marine units, which increases costs further and takes scarce LE assets away from their normal duties.

OBJECTS OF THE INVENTION

It is an object of the present invention to provide a system and/or an associated methodology that presents a search and rescue coordinator or a safety or security controller at least in part with radar-derived information, regarding a last known radar position of a distressed or reported vessel or aircraft, that is easy to obtain and tactically use in search design and response processes, especially for overdue or high-risk incidents involving uncooperative targets.

It is a further object of the present invention to provide a system and/or an associated methodology that provides a search and rescue coordinator or a safety or security controller with easy-to-obtain and -use, radar-derived information that results in a more accurate DATUM and smaller search area, thereby reducing the time and cost of search and rescue or interdiction.

Another object of the present invention is to provide a system and/or an associated methodology that furnishes a search and rescue coordinator with easy-to-obtain and -use information regarding a first known radar position of a distressed or drifting vessel or float plane for tactical use in establishing whether the incident is due to an accident, requiring an immediate response, or due to other factors such as owner carelessness or deliberate abandonment, neither of which requires an immediate response.

An additional object of the present invention is to provide a system and/or an associated methodology that presents a safety or security controller with easy-to-obtain and -use information regarding a first known radar position of a reported aircraft or vessel involved in a risky situation such as a near-miss, for tactical use by the controller in establishing whether the incident was careless, clueless or deliberate and in directing response and interdiction.

Yet another object of the present invention is to provide a system and/or an associated methodology that generates, for a security or safety controller or a search and rescue coordinator, easy-to-obtain and -use, radar-derived information that helps corroborate human-reported incidents involving vessels or aircraft, thereby enabling an appropriate response.

A further object of the present invention is to provide smart radar systems and methods that are able to rapidly connect the dots between (i) incident data associated with sparse and/or stale reports they receive from the public or stakeholders in relation to a safety or security incident involving a vessel or aircraft and (ii) continuously updated and voluminous radar surveillance data which may contain corroborating and/or valuable localization information about the incident, and which is particularly challenging, if not impossible, for a human to mine (locate, identify, extract, interpret) in busy maritime or airport environments with many uncooperative targets.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein. It is also to be noted that while the search and rescue application will be the dominant application used to illustrate the operational concepts, challenges, and benefits of the present invention, they equally apply to other applications involving uncooperative targets such as drone (also referred to as unmanned aircraft systems (UAS) or remotely piloted aircraft systems (RPAS)) sightings at or near airports that pose a risk to both aviation safety and security.

SUMMARY OF THE INVENTION

A system in accordance with the present invention is particularly useful for assisting SAR coordinators because the system can rapidly "connect the dots" between sparse and stale incident reports collected from humans and unassociated and voluminous radar data. This detection and selection of pertinent radar data is achieved through systemic radar intelligence, where recent historical radar track data typically spanning a time period from when the vessel sets out from shore to contemporaneous search time are automatically mined, or searched, and analyzed by a specially designed processor in order to extract candidate vessel trajectories formed from radar tracks that collate or align with a scenario as described in one of more incident reports. This new tactical and actionable radar data processing system provides critical and unknown position data which allows coordinators to optimize a search pattern and allocate appropriate response resources to reduce stakeholder risk. This smart radar corroboration system supports search and response personnel in responding to high-risk safety or security incidents involving uncooperative vessels or aircraft and provides a new radar intelligence capability that human beings cannot implement on their own, at least not with sufficient speed to effectively assist search and rescue operations.

The present invention recognizes that most SAR incidents occur for uncooperative vessels such as recreational boaters and unregulated commercial vessels and is directed towards assisting SAR coordinators in overdue and similar situations, where timely and accurate LKPs are unavailable, resulting in large search areas that increase the risks and costs to stakeholders.

The present invention seeks to overcome the aforementioned limitations by delivering new and practical methods and systems which rapidly provide SAR coordinators with position information where none is otherwise available or where the position information enhances and updates available position information. More particularly, methods and systems of the present invention provide such information inter alia in the form of Last Known Radar Positions (LKRPs) and First Known Radar Positions (FKRPs), in response to SAR incidents including overdues and involving uncooperative targets. The LKRPs/FKRPs along with other relevant radar and sensor data, such as camera data, described herein are used tactically by the SAR coordinator to corroborate/validate a SAR incident, refine the DATUM, refine the search design, and/or refine the response. A system in accordance with the present invention electronically scours stored raw radar track data not associated with known (i.e., cooperative) or human-monitored targets and extracts new position information likely pertinent to a SAR situation. As described hereinafter, the system is configured to construct possible target trajectories from fragmentary or incomplete radar data so as to extract candidate vessel positions subsequent to last known positions and/or prior to first known positions in current SAR incident reports, thereby facilitating SAR operations.

These aforementioned uncooperative targets are taken from the group consisting of (i) watercraft that do not report their true position to a relevant authority continuously at least once per minute, including recreational boats and pleasure craft of all kinds, commercial vessels, research vessels, and autonomous vessels; (ii) watercraft whose identity is unknown to the relevant authorities; (iii) aircraft that do not report their true position to a relevant authority continuously at least once per minute, including general aviation aircraft, unmanned or remotely piloted aircraft systems including recreational and commercial drones, and autonomous aircraft; and (iv) aircraft whose identity is unknown to the relevant authorities. A relevant authority in the above context is the SAR coordinator or any stakeholder who provides the SAR coordinator with the aforementioned position and identity information.

The present invention provides smart radar systems and methods that can automatically generate probable candidate vessel and/or aircraft trajectories, with LKRP and FKRP that may be associated with incident reports received by a safety or security controller or system. We refer to an incident report received by a system or method in accordance with the present invention as a target incident data. And we refer to the candidate vessel and/or aircraft trajectories, LKRP and FKRP data, and associated sensor data including camera snapshots or video generated by the system or method and returned to the requestor (i.e. to a person or a system) as the corroborating radar data.

The present invention improves the performance of radar systems through the addition of artificial intelligence (AI), allowing the systems to automatically learn from past experience and rapidly mine a radar system's memory banks to provide corroborating radar data in response to target incident data. AI enables a radar data processing system to learn from its environment and reconfigure its operations and functionality in response to its success and failure in mining radar data. AI, in accordance with the present invention, can preferably use other data sources such as camera data in addition to radar data.

The present invention concerns a novel radar system and method that helps emergency coordinators or controllers quickly define a more precise search area associated with a reported SAR incident, so that response personnel can be quickly dispatched to the area and their search to find the reported target will hopefully be faster and more successful. A system pursuant to the invention rapidly connects the dots between disparate information sources, the first being human observations about the incident which are generally trusted until proven otherwise, and the second being radar data that may have captured part or all of the incident. As those skilled in the art appreciate, radar is the gold standard sensor for detecting and localizing uncooperative vessels and aircraft.

The challenge in connecting the dots between these two disparate information sources is best illustrated by building on the hypothetical example of an overdue vessel described earlier. Consider an uncooperative vessel that travels an average speed of 10 knots and that is reported overdue to the Coast Guard (CG) around 1900 local time, eight hours after the vessel set out from Jordan Harbour on Lake Ontario. The vessel reportedly set out around 1100 local (1500 UTC) on 16 May 2019. The target vessel could be anywhere within an 80 nautical miles radius, depending on the actual route it took and when, if at all, it ran into trouble and started drifting, or sank. The initial LKP was assessed by the SAR coordinator to be Jordan Harbour at 1100+/−one hour. Without any further information to narrow the search area, most of Lake Ontario could be the subject of the search, with about 40% of the search area occurring in the United States and 60% of the search area occurring in Canada. The search area is on order of 2,500 square miles and would require numerous air and vessel assets. Without any additional information to narrow the search, the outcome is not hopeful if in fact the vessel ran into trouble (e.g. took on water, man overboard, et cetera). Darkness is approaching quickly and it will take many hours to search. The problem arises because the overdue report received from the family member was stale, some eight hours after its associated LKP. This is precisely the challenge that occurs with incidents involving uncooperative targets; you don't know there is a problem until several hours after the fact! And when you do learn you have a problem, you don't have a cooperative target ID or name that you can simply query or look up in a databank in order to find the target in question and obtain its current location. Even if the SAR coordinator had access to a radar system that could replay the radar data over the prior eight (8) hour period, manually attempting to mine the data to find the overdue vessel in a busy maritime environment is an onerous and time-consuming task that is not practical for humans to carry out so as to achieve the desired results of timely expediting SAR efforts. The impracticality for humans is easily seen in the example of FIGS. 5 and 6 that follows, where in addition to a busy target environment and eight hours of data to review, backward and forward propagation processes along with track stitching as described herein are simply beyond human intellectual capabilities.

Now the present invention assumes that a radar system or radar network monitors the area in question in real-time and retains historical target data for all tracked targets that can be searched for data of interest. For example, see U.S. Pat. No. 7,940,206 B2 which describes radar systems that can be used for this purpose.

Radars generate large amounts of target data, typically updating target positions every couple of seconds. For busy target environments like Lake Ontario in the late spring and summer, many gigabytes of data can be generated just in relation to one SAR incident. The challenge is to provide the technological means to quickly find the proverbial needle in the haystack, being the target track or tracks and other characteristics such as respective LKRPs and FKRPs that may be associated with the SAR incident in question. The present invention uses the human-reported initial LKP information and other descriptive incident information, collectively the target incident data, to automatically mine the big radar data in order to discover and extract corroborating radar data including candidate target trajectories.

Let's illustrate what we mean; we will make reference to FIG. 5 and a particular smart radar method for generating corroborating radar data. A target information system (TIS) in accordance with the present invention continuously organizes and stores radar data in real-time in a queryable database that preferably is a SQL database. In our example, it is now 1900 on 16 May 2019 and we will assume that a target incident processing system (TIPS) in accordance with our invention has access to the target incident data which includes the presumed LKP information and other descriptive incident information. For this example, the TIPS directs the TIS to go back to 1000 this morning and provide the historical radar tracks from 1000 to 1200 (in accordance with the presumed LKP which was estimated to be 1100+/− one hour) which are presumably vessels (which we refer to simply as targets) that emerge from Jordan Harbor into the Lake Ontario. The TIPS assesses the returned targets for consistency with the incident information and further requests from the TIS to forward propagate in time (because all the historical data is available up to the present time) each selected target up to the current time (if the particular vessel is still being tracked by the radar system) or to the time where it was last tracked by the radar system. The TIS returns to the TIPS the target tracks for the selected targets. Because it is a busy morning, several vessel tracks are returned as possible candidates for the overdue vessel. Because we know the type of vessel and characteristics such as its maximum speed and average speed, the TIPS can preferably filter the candidates further (using for example, speed, acceleration and/or size filters) so that we end up with a list of viable candidates associated with the presumed LKP.

For any viable candidate radar track that ended (i.e., the track was dropped) before the current time, the TIPS can further query the TIS for any newly initiated tracks (i.e., tracks that started not long after the dropped track) that may be associated with the dropped track. The TIPS can determine if any newly initiated track is consistent and associates in a probabilistic sense (using algorithms known to those skilled in the art such as multiple hypothesis testing) with any dropped track, allowing the TIPS to stitch such associated tracks together thereby extending the dropped track and forming a more complete, probable trajectory with a more current (in time) LKRP. The process can continue iteratively, based on the data itself and the prior probabilistic decisions, to identify tracks that may belong to the target of interest (i.e. the target that is the subject of the target incident data) so that the TIPS can generate one or more viable candidate trajectories and associated LKRPs to return as corroborating radar data. Track stitching overcomes track continuity problems experienced by practical radar networks covering large areas of water. Targets can drop for any number of reasons including line of sight (LOS) obstructions (e.g., terrain, discrete fixed objects in the environment such as buildings, bridges, and storage tanks, and other targets), distance from the nearest radar, target fading, clutter, and target aspect angle.

A calculated set of corroborating radar data for the subject example is illustrated in FIG. 5. For each track, its FKRP and LKRP are automatically determined by the system (they are illustrated in FIG. 5 with push pins) and returned to provide numerical location and time information directly back to the SAR coordinator for use in the SAR Mission Planning System (MPS). These data are used by the SAR coordinator to establish finer search parameters. FIG. 6 illustrates the set of vessel tracks that were automatically mined by the system in accordance present invention in order to generate the corroborating radar data shown in FIG. 5. This real example is only a light traffic environment in May. Summer environments are many times busier.

In the present example, the corroborating radar data provided by the smart radar system include a handful of candidate radar trajectories with LKRPs and FKRPs for immediate, tactical use by the SAR coordinator that can significantly change the approach and outcome of the search and response. With the means of connecting of the dots in real-time between the disparate sparse and stale human reports (organized into target incident data) and the rich radar data in accordance with the invention, smart radar systems in accordance with the present invention are able to fill in the gaps, provide LKRPs and FKRPs, and corroborate the situation.

The corroborating radar data generated by the present invention for this example could lead the SAR coordinator to any number of possible actions, including, for example:

1. For candidate tracks that are still being tracked by the radar system in real-time, the SAR controller may call out to nearby cooperative ships or SRUs and ask them to swing by and provide a description of the uncooperative vessel to confirm if it is the overdue vessel in question. If it is, and all is well, the SAR incident can be closed, the overdue vessel operator can be told a worried family member is waiting and worried, and the worried family member can be called and assured that all is well.
2. The search area may be optimized accounting for the corroborating radar data. The search area may be made much smaller and restricted to waters between Jordan Harbour and Port Weller, for example, an area that is about 100 square miles or 4% of the original area.
3. SRUs may be dispatched to the search area to begin the search, and respective search patterns may be optimized by running drift models for each candidate LKRP including assigning approach vectors to the search area for each respective SRU.
4. The entire process may be iterative. If new human reports come in (e.g., a drifting vessel is reported, or debris from a vessel is sighted at a particular location and time), they can be used by the smart radar corroboration system to generate new corroborating radar data.

In the above example, we had initial vessel departure location information but lacked its current or last known position. On the opposite extreme, we have the current location or LKP, but we lack the initial location, i.e., where the vessel started out from, which is necessary to assess the situation. Take the case of a drifting vessel that is reported by an observer with no persons on board. The same smart radar corroboration system may then be used to propagate backwards in time in order to arrive at the departing location, which may be a marina or another shoreline location. In this case, the system is looking for the FKRP. The FKRP can help the SAR coordinator quickly investigate how many people were on board and who they were. For example, if the FKRP for a drifting vessel is at a marina, police could be dispatched to speak with personnel at the marina and to check surveillance cameras to determine this information. On occasion, careless tying down of a vessel or float plane can result in it becoming untethered and drifting away, causing a large, unnecessary search for persons overboard.

It should be noted that in both cases of forward propagation or backwards propagation in time, radar tracks may drop and restart, a phenomenon known to those skilled in the art (due to various factors such as LOS problems, target distance from the radar, target fading/scintillation and clutter). As a result, the smart radar corroboration system can automatically advance (or recede) time beyond the end (or start) of a track to determine whether additional tracks are available that are likely connected, in the causal sense, to the dropped track. These track segments can be temporally stitched together and further analyzed by the system to arrive at the ultimate LKRP (or FKRP). Those skilled in the art will recognize tracks dropping and restarting in FIG. 5.

In addition to smart radar improvements over state-of-the-art radar systems, the present invention also concerns practical improvements over state-of-the-art SAR mission planning processes and systems. These improvements include the following features:

- The use of corroborating radar data to rapidly corroborate human reports for SAR incidents involving uncooperative targets, thereby determining whether the reported incident is a true incident requiring a SAR response
- The use of corroborating radar data including FKRPs associated with drifting vessels or aircraft to determine where they came from and assess whether they are true SAR incidents requiring a SAR response, or whether they should be reported to authorities such as police or harbor masters to investigate
- The use of corroborating radar data including LKRPs that are used to improve the DATUM and optimize a search area
- The use of corroborating radar data to help direct the search patterns of SRUs It will be obvious to those skilled in the art that the smart radar corroboration system invention is applicable to any situation where sparse or stale human reports concerning uncooperative targets are reported to an authority who is required to assess the risk, design a search area, and assist in conducting a search in order to find and secure the target of interest, thereby containing risk.

One such situation is the case of a reported drone (also called unmanned aircraft system (UAS) or remotely piloted aircraft system (RPAS)) in the vicinity of an airport where there is an aviation safety risk. If an arriving or departing aircraft were to strike the drone, a catastrophe could occur resulting in significant loss of life and cost. Even a near-miss with a drone puts an aircraft at significant risk and indicates the drone is in the critical airspace. Take the example where a pilot on approach to an airport reports seeing a drone a few miles out loitering in the critical airspace. The next pilot on approach to the same runway also reports seeing a drone. Pilots only get a glimpse of small targets such as drones and can typically only provide approximate locations. The airport coordination center (ACC) needs to quickly assess the situation. The several possibilities include:

1. The remote drone pilot was clueless or careless and accidentally flew the drone into the critical airspace and continues to cause a threat;
2. The drone pilot was clueless or careless and accidentally flew into the critical airspace and is no longer causing a threat; or
3. The drone pilot has criminal intent and deliberately flew the drone into critical airspace to cause harm.

The pilot reports are analogous to the aforementioned SAR human reports. Corroborating radar data are provided by the smart radar system and used in accordance with the present invention to corroborate the pilot reports, and provide trajectories, FKRPs and LKRPs. If the pilot reports are corroborated, the ACC controller may need to shutdown the runway in question, or even the whole airport, until a search area is defined and response units are dispatched to interdict. The FKRP could be an indicator of where the drone operator is located and authorities could be dispatched to the FKRP to search for and apprehend the operator. At the same time, the LKRP, especially if it is live and the drone continues to be tracked by the radar system, can be provided to authorities to search for the drone, close in on it, and take it down by force if necessary to secure the situation.

It should be noted that human reports of drones at airports could also come from operators of other sensors or be reported to the smart radar system by the sensor itself or another reporting system. For example, a Foreign Object Debris (FOD) sensor may detect and alert to a drone on a runway. The FKRP associated with the FOD alert could tell the ACC coordinator where the drone came from and again provide a search vector to find the drone operator.

In light of the above, the present invention affords significant practical improvements to existing drone detection and containment systems at use at airports (or other applications such as critical infrastructure or even prisons), which are virtually non-existent, and for which there are no standards because of the newness of drone threats in contrast to SAR mission planning processes and systems. The present invention provides the following capabilities for mitigating drone risk at airports:

- The use of corroborating radar data to rapidly corroborate human reports of drone sightings, including pilot reports, reports from the public and reports from other sensors such as FOD or camera sightings, thereby determining whether the reported incident is a true incident requiring an airport response;
- The use of corroborating radar data associated with a drone sighting to determine where the drone came from and to help assess whether drone flight path behavior is consistent with a clueless, careless or criminal drone operator which affects the risk level and response;
- The use of corroborating radar data including FKRPs associated with a drone sighting to guide police and other authorities to the probable location of the drone operator so (s)he can be apprehended, either immediately, or in the future when encountered through adjusted patrols in the identified area;
- The use of corroborating radar data including LKRPs that are used to improve the DATUM and optimize the search area, recognizing that if the sighted drone is still airborne, the DATUM and search area will be continuously updated;
- The use of corroborating radar data including LRKPs to help direct the search patterns of the response units. The ACC coordinator may provide continuous updates to response units who will contain a search area in order to close in on and interdict the threat;
- The use of corroborating radar data in the decision-making process to close down a runway or the airport, based for example on the corroborated risk level; and
- The use of corroborating radar data in the decision-making process to re-open a runway or the airport, based for example on the absence of continued drone operations in the critical airspace.

It should be noted that today, virtually all drones are uncooperative targets in accordance with the present invention. They do not broadcast their identification (ID) and location to relevant authorities. The United States Federal Aviation Administration (FAA) RemoteID program will help regulate drones of a certain size, by requiring them to broadcast their ID/location to authorities. Even when such regulations come into play, there will be a phase-in period resulting in many drones remaining as uncooperative targets. An even if and when all drones are regulated, operators of drones intending to disrupt airport operations or conduct criminal activities will disable such ID/location broadcast features.

Similar applications involve the reporting or sighting of a drone in the vicinity of critical infrastructure such as a bridge, nuclear facility, or stadium where the drone operator could have criminal intent to cause harm, for example with an explosive payload. Drones can also be used for delivering contraband into prisons (fly over and drop) and may carry out reconnaissance at stand-off distances first before doing so.

In accordance with the present invention, a smart radar data mining and target location corroboration system for supporting search and response personnel in responding to high-risk safety or security incidents involving an uncooperative vessel or aircraft, comprises:
  a. a target incident processing sub-system configured to receive target incident data concerning an uncooperative target where the target incident data is stale in time or includes imprecise target location information, the target incident processing sub-system further configured to rapidly mine large volumes of historical radar track data to extract corroborating radar data pertinent to the target incident data, the corroborating radar data collected at least tens of minutes and possibly hours prior to receipt of the target incident data by the target incident processing sub-system; and
  b. a target information sub-system configured to receive continuously in real-time radar track data for targets in a region of coverage where safety or security incidents occur and store the track data in a database in real-time so that the radar track data can be accessed, queried and further processed by an operatively connected data processor, the targets including uncooperative targets,
  c. the target incident processing sub-system being operatively connected to the target information sub-system and further configured to automatically define one or more queries in relation to the target incident data and send the one or more queries to the target information sub-system in response to the target incident data,
  d. the target information sub-system being further configured to receive the one or more queries and to generate corresponding queried radar track data and send the queried radar track data to the target incident processing sub-system in response to each of the one or more queries, the queried radar track data containing relevant track data from the target information sub-system that is consistent with the one or more queries,
  e. the target incident processing sub-system further configured to receive the queried radar track data and process the queried radar track data to generate the corroborating radar data, the corroborating radar data being probabilistically associated with the target incident data so as to support, enhance, update, clarify, or correct the target incident data, and to return the corroborating radar data in response to the target incident data.

A related smart radar data mining and target location corroboration method for supporting search and response personnel in responding to high-risk safety or security incidents involving an uncooperative vessel or aircraft, comprises:
  a. operating a target incident processing system to receive target incident data concerning an uncooperative target wherein the target incident data is stale in time or includes imprecise target location information, the target incident processing system being configured to rapidly mine large volumes of historical radar track data to extract corroborating radar data pertinent to the target incident data, the corroborating radar data collected at least tens of minutes and possibly hours prior to receiving the target incident data; and
  b. controlling a target information system to receive continuously in real-time radar track data for targets in a region of coverage wherein safety or security incidents occur and to store the track data in a database in real-time so that the radar track data can be accessed, queried and further processed by an operatively connected data-processing system, the targets including uncooperative targets,
  c. further operating the target incident processing system to define one or more queries in relation to the target incident data and send the one or more queries to the target information system in response to the target incident data,
  d. further controlling the target information system to receive the one or more queries, generate corresponding queried radar track data, and send the queried radar track data to the target incident processing system in response to each of the one or more queries, the queried radar track data containing relevant track data from the target information system that are consistent with the one or more queries,
  e. additionally operating the target incident processing system to further receive the queried radar track data and process the queried radar track data to generate the corroborating radar data, the corroborating radar data being probabilistically associated with the target incident data so as to support, enhance, update, clarify, or correct the target incident data, and return the corroborating radar data in response to the target incident data.

A more general related method in accordance with the present invention is a smart radar data mining and target location corroboration method for supporting search and response personnel in responding to high-risk safety or security incidents involving an uncooperative vessel or aircraft, comprising:
  a. receiving a human report about a safety or security incident involving an uncooperative target whose last known position was at a time hours before the time of receiving the human report, and generating target incident data from the report;
  b. providing the target incident data to an automatic radar service available through at least one method taken from the group consisting of Web portal, Web site, service desk, Web Services;
  c. upon receipt of the target incident data, operating the automatic radar service to mine a radar track database from the time of the last known position of the uncooperative target to a present time to uncover corroborating radar data that provides more current location information taken from the group of (i) target trajectories containing location versus time data points, (ii) last known radar position and corresponding time, and (iii) first known radar position and corresponding time that are probabilistically associated with the uncooperative target;
  d. further operating the automatic radar service to return the corroborating radar data uncovered in response to the provided target incident data; and
  e. using the corroborating radar data to assist in performing an action taken from the group consisting of (a) corroborating target incident data, (b) assessing incident risk, (iii) calculating a DATUM, (c) designing a search area for the incident, and (d) developing guidance to direct response.

The present invention concerns uncooperative targets taken from the group consisting of (i) watercraft that do not report their true position to a relevant authority continuously at least once per minute, including recreational boats and pleasure craft of all kinds, commercial vessels, research vessels, and autonomous vessels; (ii) watercraft whose identity is unknown to the relevant authorities; (iii) aircraft that do not report their true position to a relevant authority continuously at least once per minute, including general aviation aircraft, unmanned or remotely piloted aircraft systems including recreational and commercial drones, and autonomous aircraft; and (iv) aircraft whose identity is unknown to the relevant authorities.

The real-time radar track data available in the target information system is preferably received from a radar network containing at least one radar sensor. The radar sensor may take the form of (a) one or more radars generating 2D track data including positions represented as latitude/longitude pairs versus time, (b) one or more radars generating 2D track data including positions represented as range/altitude pairs versus time, and (c) one or more radars generating 3D track data including positions represented as latitude/longitude/altitude triplets versus time.

Presently, there are mission planning systems available to support search and response personnel who rely on human incident reports, and there are radar systems available that are capable of tracking uncooperative targets and provide rich, historical and live tracking data.

However, as described above, no known systems provide means to rapidly use these unassociated, big data radar sources to corroborate the sparse and often stale human incident reports in order to fill in critical gaps in their situational awareness and understanding of what has transpired and/or is continuing to transpire on the waterways or in the air. As already described above, and as further described herein, the present invention provides such novel systems and methods to overcome these limitations.

The smart radar corroboration system in accordance with our invention includes a specialized data processor we refer to as the target incident processing system (TIPS) working hand-in-hand with a target information system (TIS) which contains the voluminous historical and real-time radar track data. The TIPS takes as its input target incident data which includes the essential presumed LKP information from the incident reports needed for mining the radar track data available from the TIS. The TIPS preferably incorporates artificial intelligence algorithms we refer to as radar intelligence to rapidly mine the voluminous radar data in search of corroborating radar data. If corroborating radar data is found, it will greatly assist the search and response personnel by giving them critical and time-sensitive information concerning LKRP, FKRP and target trajectories that are key to a successful mission.

The necessity for this invention arose from our experience over a two year period working concurrently with Canadian and American professionals responsible for SAR incidents on the Great Lakes, and with American airport professionals responsible for drone sightings in the vicinity of a major international airport. In both cases, the inventors made available a respective target information system in accordance with the present invention providing the requisite radar coverage, and implemented standard situational awareness approaches to support professionals with SAR incidents on the Great Lakes and the drone incidents identified through pilot reports in the airport environment. Our standard approaches failed in terms of impacting the outcome of the search and response efforts. It became evident to us that, with the current state of technology, human operators cannot access and interpret raw radar track data so as to extract target trajectory information of practical value for SAR efforts. Human operators, even with the benefit of contemporary software interfaces such as Internet browsers, are unable to sift through voluminous and unidentified radar track data to determine potential or candidate trajectories and updated LKRP and FKRP for SAR targets.

Our approach, and the one those skilled in the art would no doubt utilize, was to deploy a browser-based radar display tool, also referred to as a common operating picture (COP), and train SAR professionals in the Rescue Coordination Center (RCC) on how to use the radar tool during a SAR incident in an attempt to mine the radar data. This tool gave the SAR coordinator and colleagues the means to pull-back time for an overdue and zoom in on the reported departure point, and then rapidly replay the radar track data to try to identify one or more candidate radar tracks that are consistent with the human incident reports. To everyone's surprise, this method proved to be very difficult and not successful.

The challenge was multi-fold as we learned by operational immersion:

1. The RCC personnel were extremely busy executing each SAR case, with multiple cases sometimes underway at the same time, making the introduction of any new tool problematic as it interrupts proven standard operating procedures.
2. The maritime environment was extremely busy, resulting in many candidate vessel targets that each needed to be extracted and reviewed and which in many cases required expert interpretation, for example when tracks dropped and restarted.
3. The radar data mining procedure could take up to an hour if the LKP was stale, occurring say at the vessel departure point several hours earlier. Time was needed to be replayed and candidate tracks followed forward to the present time before their full trajectory including the LKRP could be determined. The same process needed to happen in reverse in the case of a drifting vessel and a desired FKRP.
4. Every time new features were introduced in the radar display tool to more rapidly mine the historical/real-time data in accordance with the invention, SAR operator retraining was needed which was problematic.
5. There was no standard language for documenting and communicating the human incident reports, for radar data mining. This introduced uncertainty into the process of connecting the dots between human reports and radar track data.
6. The SAR operation needed to proceed at full speed and couldn't wait for the radar data mining procedure to be completed. This made it difficult to incorporate radar information about the SAR incident into mission planning and response.

The target incident data in accordance with the present invention includes information about the subject target (vessel or aircraft) including approximate location(s) and corresponding time(s) to the extent available. For example, for the case of an overdue vessel, the target incident data is stale in that it describes an incident with a presumed last known position (LKP) that occurred much earlier in time. In other cases, say for the case of a discovered drifting vessel or float plan, or a pilot report of a drone sighting, the target incident data describes an incident involving a target whose origin or first known position is unknown but whose LKP is known.

The corroborating radar data in accordance with the present invention includes one or more items taken from the group consisting of: (i) at least one target trajectory generated from one or more radar tracks fused or stitched together, each trajectory providing multiple position updates versus time; (ii) at least one last known radar position (LKRP) and corresponding time; and (iii) at least one first known radar position (FKRP) and corresponding time.

There are multiple ways in accordance with the present invention that the TIPS can be operatively connected to the outside world.

In the simplest case, the operative connection between the TIPS and a SAR mission planning system is through the use of a service desk through which the exchange of the target incident data and the corroborating radar data occurs. For example, the service desk could provide the aforementioned exchanges using a human-to-human interface between the SAR incident coordinator of the mission planning system and a TIPS operator, where the human-to-human interface uses at least one communication channel such as audio telephone communication, e-mail communication, and human interaction with a web page or software application.

In an alternative implementation, the TIPS operator is replaced by a software interface such as a Web page or software application so that aforementioned human-to-human interface is replaced by a human-to-machine interface. In this case, the operator of the mission planning system provides the aforementioned Web page or software application with the target incident data and receives the corroborating radar data in return.

In another preferred embodiment of the present invention, the operative connection between the mission planning system and the TIPS is through the use of a machine-to-machine interface through which the exchange of target incident data and corroborating radar data occurs. In this case, the machine-to-machine interface provides the aforementioned exchanges between (i) a software interface associated with the mission planning system and (ii) a software interface associated with the TIPS. The operative connection between the mission planning system and the TIPS is provided using a communication channel such as a local area network, a wide-area network, a wireless connection such as a cellular connection, WiFi connection, radio or satellite communication connection, and an Internet connection. The machine-to-machine interface can support a rapid turnaround of the corroborating radar data on the order of seconds due to machine automation, which greatly enhances search and response capabilities.

A smart radar corroboration system in accordance with present invention preferably uses camera data in addition to radar data to generate corroborating radar data. Much like the human brain uses multiple senses to understand its environment, so too can our corroboration system. Whereas radar does an excellent job detecting and tracking targets of interest, providing their location, velocity and radar cross section (RCS) over time, cameras add identifying information by providing photographs or videos of the target. The target camera data is preferably made available to the TIPS from the TIS, although the TIPS could obtain the camera data directly from another source without departing from the invention. For the purposes of this embodiment, one or more of the candidate tracks provided by the TIS to the TIPS includes respective, associated camera photos and/or video clips which show the respective targets being tracked. For the case where the corroborating radar data was made up in part by any tracks with associated camera photos or video clips, these camera data may be included in the corroborating radar data to provide the SAR controller with the identifying information. The identifying information, depending on its quality, can give the SAR controller more confidence that the corroborating radar data does in fact correspond to the target of interest which may result, for example, in tighter search parameters.

In a preferred embodiment of the present invention, corroborating radar data are generated by the TIPS with the help of artificial intelligence (AI) processing to rapidly mine the radar track data (and camera data if available) provided by the TIS. The AI processing is designed to implement advanced, cognitive processing functions that humans cannot perform because of vast amounts of radar data associated with them.

The AI processing in accordance with the invention serves to capture the expert knowledge associated with mining the radar data (and camera data if available) to find the proverbial needle in the haystack. Capturing this expert knowledge allows the invention to use a machine-to-machine interface to most rapidly generate the desired corroborating radar data in response to provided target incident data.

A novel feature of the AI processing in accordance with the present invention is that it finds candidate tracks in part by using automatic target behavior recognition algorithms. Target behavior recognition algorithms include target departure behavior algorithms, target enroute behavior algorithms, and target type behavior algorithms. For example, take the case of a sailboat versus a jet ski. These two types of vessels have very different type behavior. The typical acceleration of a sailboat which is wind driven is very small compared to a jet ski that can accelerate from 0 to 60 mph in a few seconds. Their respective dynamics also differ, for example in terms of speed distributions, maximum speed, and acceleration distributions. They may have similar departure behavior depending on where the departure is. For example, departure from a marina will likely have lanes and speed limits that will make their departure behavior similar. Their enroute behavior, once out in a lake would typically be dramatically different. A sailboat might exhibit long segments of near continuous velocity with periodic zig/zag patterns using tacking maneuvers to head upwind. A jet ski, on the other hand, who have a track that likely includes all kinds of maneuvers with acceleration/deceleration patterns indicative of having fun. These target behaviors are generalizable to all kinds of vessels and targets of interest.

An AI processor may learn each of these target behaviors using actual radar track training data, for example, with supervised learning where the radar tracks used for training have been classified into a sailboat class and a jet ski class. When a sailboat or jet ski (or other target) is reported overdue, the target incident data will contain the target type. The AI processing in TIPS will then apply the target behavior recognition algorithms to the candidate tracks provided by the TIS, in order to prune out candidate tracks whose behavior is not consistent with the overdue vessel. The target behavior recognition algorithms effectively compare and score the candidate tracks against the known target types using a variety AI or pattern recognition algorithms known to those skilled in the art.

Target behavior recognition algorithms may also be applied in an analogous fashion to drones tracked in the vicinity of airports, to determine, for example whether the corroborating radar data associated with a drone sighting is consistent with a clueless, careless or criminal drone operator which affects the risk level and response. For example, a racetrack pattern that repeatedly edges into an aircraft corridor of an airport might be indicative of a clueless or careless operator that inadvertently gets too close and penetrates a risked airspace. A deliberate point A to point B flight path that crosses an active runway at risk altitudes, or a flight path where a drone flies over the airport fence and hovers is more indicative of criminal behavior. The AI processor in this case may classify the drone target behavior which may be included in the corroborating radar data provided by the TIPS.

Another novel feature of the present invention is to use AI processing to automatically classify the camera data that is associated with the radar tracks operated on by the TIPS. In this case, image recognition algorithms known to those skilled in the art are used to automatically determine the type of target (e.g., sailboat, jet ski, yacht, inflatable boat, canoe, cabin cruiser, . . . ) being tracked. When such classified tracks are part of the corroborating radar data, the classified target type is also included.

Preferably, track data that has been automatically classified as to target type using the associated camera data may also be used by the TIPS in combination with the aforementioned AI-based target behavior algorithms to better select candidate tracks that are more likely to be associated with the target incident data. For example, the type classification score from the image recognition algorithm (which is indicative of the confidence of the type classification) can be weighted or combined with the AI-based target behavior score to improve candidate track selection.

In one embodiment of the invention, the aforementioned track stitching algorithms are applied to TIS track data without the application of the aforementioned AI-based target behavior and camera data classification algorithms. For example, all candidate tracks may be stitched prior to the application of any AI processing.

In another embodiment of the invention, the aforementioned AI-based target behavior algorithms and AI-based camera data classification algorithms are used individually or together to improve the performance of the aforementioned track stitching algorithms, which results in higher quality corroborating radar data. In this embodiment, at each iteration of track stitching (either in the forward propagation or back propagation direction as the case may be), each of the set of tracks that could potentially be stitched to the given track are scored for consistency with the given track in terms of its target behavior and/or target classification. The consistency scores may be used together with the respective track-to-track likelihoods to determine the best track-to-track association and make the appropriate track stitching assignment.

The aforementioned AI-based target behavior and camera data classification algorithms may be used in a similar fashion to distinguish candidate and corroborating radar tracks from a drone and a bird in the airport environment.

Furthermore, the TIPS may utilize other secondary sensor data types as part of its AI processing in an analogous fashion to camera data, to improve the quality of its corroborating radar data. For example, in an airport environment, drone detecting RF sensor data can be used to help distinguish between a bird and a drone by indicating an azimuth sector where a drone's RF signal is being detected; and real-time flight plan data associated with authorized drone flights can be used to determine drone intent. In the maritime environment, weather data can be used to geographically localize weather events that may have contributed to a vessel's distress, as can sector data received through GMDSS distress calls.

Those skilled in the art will appreciate that there are numerous ways that the AI processor can be implemented which are all in the spirit of the invention. The AI algorithms can include, for example, open-loop rule-based or fixed-model engines as well as complex machine learning algorithms for the TIPS. Open-loop AI algorithms use target models and sensor data models that may be trained from real-world sensor data, but which are non-self-adapting once trained and configured. The models represent various expected behaviors or patterns associated with the sensor data and may be used, in accordance with the invention, in various behavior/pattern recognition techniques known to those skilled in the art to estimate, predict or classify candidate radar track and camera data. Machine learning AI algorithms, on the other hand, have feedback in them and use past decisions (e.g., past estimates, predictions, classifications, target incident data and corroborating radar data, et cetera) to automatically learn the efficacy of the underlying models and adapt the models based on new radar and camera data and target incident data to improve performance.

Machine learning can employ a variety of learning algorithms including supervised and unsupervised learning, as well as other forms such as reinforcement learning. The supervised learning algorithms may be applied, for example, in the regression (e.g., track stitching, target behavior) and classification (e.g., camera data target type) processing described above. However, unsupervised learning (e.g., K-means) may also be used, for example to cluster, for example, vessel tracks exhibiting similar target behavior.

The TIS historical data and real-time data serve as a useful repository of training data to initially (and periodically—e.g., once per year) instruct or train the AI processing and to continuously refine the AI processing, accounting for the actual performance of the TIPS, as well as various local weather, topography, interference, coverage and target conditions that may be experienced in a particular area.

Those skilled in the art will appreciate that the smart radar data mining and target location corroboration system described herein can be used in any application that involves an incident associated with a vessel, aircraft or vehicle. The present invention can be used anywhere there is a need to rapidly "connect the dots" between sparse and stale incident reports collected from humans and unassociated and voluminous radar data. For example, law enforcement personnel may provide target incident data to the TIPS concerning a suspicious observation reported by resident that might involve criminal activity (e.g., smuggling), and rapidly receive in return corroborating radar data to be used to support their investigation and hopefully make lead to arrests if appropriate. For illustration purposes, take the case of a small vessel that is seen departing a Canadian shoreline location and heading out into a lake or river towards the United States late at night immediately after loading some unknown goods from a vehicle into the vessel. The LKRP would be of interest here, and American authorities could also be waiting on the other side to interdict. Or take the case where a vessel arrives on the Canadian shoreline and is seen loading goods into a vehicle; the FKRP would be of interest. Or take the case where a mariner reports a rendezvous in the middle of the lake or river, and the LRKPs and FKRPs associated with both vessels are of interest. For each of these examples, the target incident data would contain the human reported information (along with a precise LKP if available) and TIPS would return the desired corroborating radar data.

A final feature of the present invention involves the use of a personal electronic vision device (PEVD) by search and rescue or search response units who are dispatched to a search area in order to search for and close in on a target of interest. The PEVD could be mounted on a response vessel, vehicle or aircraft. The PEVD as described in U.S. Pat. No. 9,625,720, incorporated herein by reference, allows each response unit to see (i.e., based on displayed radar tracks) the corroborated target(s) in the assigned search area in a user-centric view, allowing it to more easily close in on the target(s) of interest. The specific approach vector, search area, search pattern, LKP, LKRP, FKRP, DATUM and other information can also be provided as overlays on the PEVD to assist responders. For a vessel search application, a 2D display is ideal. For a drone search application, both 2D and 3D displays are effective. If the corroborated target or targets are still being tracked at the current time, those tracks can be updated in real-time or periodically on the PEVD to provide response units with current information. One preferred embodiment has the TIPS connected operatively to the response unit PEVD, and in a second preferred embodiment, the PEVD is operatively connected to the MPS to receive the corroborating radar data, so that the SAR controller doesn't have to take the time to communicate the corroborating radar data by radio, telephone or text. The use of a PEVD is especially beneficial if a corroborated target is being tracked and is moving. In large bodies of water, it can be quite challenging for a response unit to intercept a moving vessel that is moving under its own power, or drifting due to strong currents and/or wind (e.g., a sail boat). The PEVD predicts forward the target track and response unit coordinates to the intercept point at some future intercept time, allowing the response unit to adopt a calculated speed and heading that assure interception. For vessels, this is a two-dimensional problem. The problem is even more challenging at night when responders can not see with their eyes and will rely entirely on the PEVD as they vector close to the intercept point. This is a safety issue for the responder as well—the last thing you want is a response unit crashing into the moving vessel of interest.

The case where a response unit is trying to intercept a clueless, careless or criminally intent drone in the vicinity of an airport that is moving often under continuous acceleration in a three-dimensional volume is far more challenging. The problem of intercepting the drone is further exacerbated if the response units are vehicles constrained to driving on roads as opposed to a response aircraft in the open airspace where the response unit can simply adjust its speed and heading at will. The onboard PEVD is especially useful in these situations. And when multiple response units are involved in the intercept of a drone (or vessel), a preferred embodiment allows and the responders to be able to see each other's real-time locations along with the updating and corroborated drone (or vessel) track.

The smart radar corroboration system in accordance with his invention is described further below in relation to the figures which detail particular embodiments. Other novel features of the present invention will become apparent.

DETAILED DESCRIPTION

Figure 1:
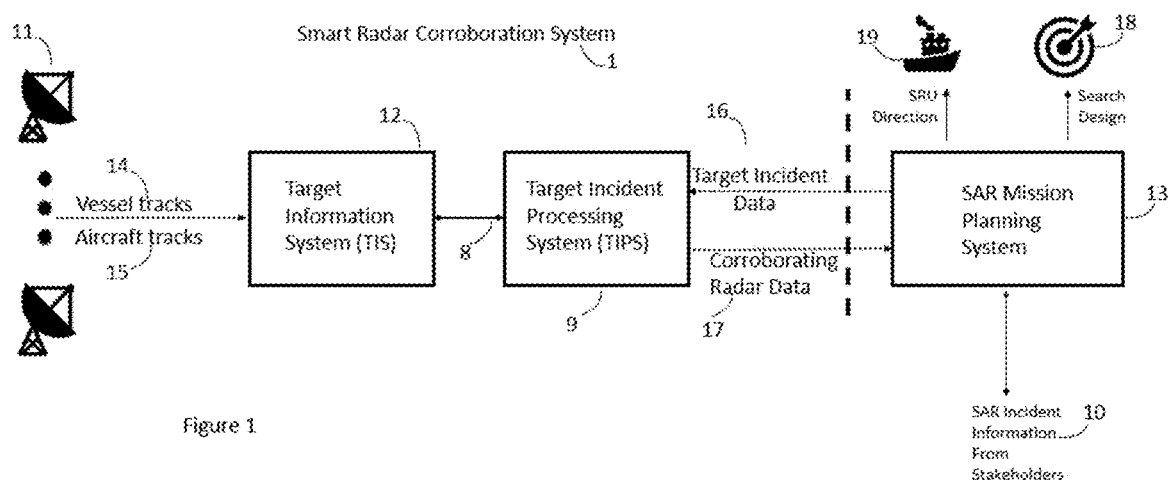
FIG. 1 is a block diagram of the smart radar corroboration system in accordance with this invention, showing a target incident processing system.

A smart radar data mining and target location corroboration system 1 in accordance with the present invention is illustrated in FIG. 1. A SAR mission planning system 13 supports SAR professionals in carrying out their mission of search and rescue or search and response, as the case may be. The acronym SAR stands for either search and rescue or search and response as the context dictates, allowing SAR mission planning system 13 to apply to any application or situation involving an incident that requires search and rescue/response capabilities. Examples of the functions of SAR mission planning system 13 are discussed above and known to those skilled in the art. National search and rescue programs tend to use purpose-built, application specific mission planning systems that may include sophisticated case management tools, search design and modelling tools, resource allocation and management tools, GIS tools, communication and reporting tools, training tools and investigative tools, and other emergency management tools, all integrated. In other applications like a small airport security operations center, or a police dispatch office, SAR mission planning system 13 may be as simple as a suite of office tools (word processor, spreadsheet, e-mail/chat) and standard operating procedures to serve as the incident management system. SAR mission planning system 13 is intended to represent all of these.

SAR incident information from stakeholders 10 (also referred to hereinafter as simply SAR incident information) is received by and/or sought by SAR professionals including a SAR coordinator; and is used by them to characterize the situation at hand and if warranted, to open a case for the incident, and manage the search and rescue or search and response processes accordingly, leading hopefully to a successful conclusion. The types of SAR incidents that motivate the present invention and the types of SAR incident information 10 have already been discussed. A core component of SAR incident information 10 is information provided by humans (including the public as well as professionals such as ship captains, airline pilots, law enforcement, harbor masters, et cetera) in the form of reports to authorities of vessel or aircraft sightings, or missing or overdue persons. These human reports, including those from the public, are taken seriously by authorities and often result in the initiation of a new incident case.

SAR incident information 10 is input into and/or organized by SAR mission planning system 13 and used by the SAR coordinator to generate a search design 18 and to provide SRU direction 19 to search and rescue or search and response units who will execute the search in the hope of finding and rescuing or interdicting the "target" that is the subject of the SAR incident, to reduce the risk for all. The targets of interest for the present invention are uncooperative vessels and aircraft as described previously. Examples of the nature of the resulting search design 18 produced under the direction of the SAR coordinator and the SRU direction 19 provided to SRUs have already been discussed. The full spectrum of search design 18 and SRU direction 19 outputs (information and processes) are known to those skilled in the art and are intended to be included respectively by search design 18 and SRU direction 19.

Target incident data 16 is received from SAR mission and planning system 13, either directly by the system itself or by the SAR coordinator or other professionals using the system, as the means for communicating essential incident information to a target incident processing system 9 (TIPS) with the hope that TIPS 9 will be able to provide corroborating radar data 17 to corroborate the incident and give valuable, additional, radar-derived information already discussed, including radar trajectories, LKRPs and FKRPs. Corroborating radar data 17 is used by SAR mission planning system 13 and/or the SAR coordinator and other professionals to influence and improve search design 18 and SRU direction 19. TIPS 9 is configured to: parse and interpret target incident data 16, formulate and send multiple queries over network 8 to target information system 12 (TIS) which contains historical and real-time radar track data, receive queried radar track data from TIS 12 over network 8 from TIS 12 pursuant to the queries formulated by TIPS 9, analyze and process the received queried radar track data using various algorithms known to those skilled in the art including those algorithms described herein such as AI algorithms, generating corroborating radar data 17, and packaging and returning or sending the corroborating radar data 17 to the requesting SAR system or SAR coordinator.

Network 8 can be any data network known to those skilled in the art to operatively connect TIPS 9 and TIS 12, including a data communication network or simply interprocess communication within a computer system, a local area network, wide area network, Internet, public network, private network, wired network or wireless network of any type. TIS 12 and TIPS 9 may be implemented on a single computer or multiple computers of any type including virtual machines and Cloud computing.

Target information system 12 provides access to real-time and historical vessel tracks 14 and/or aircraft tracks 15 generated by and received from one or more radars 11. In a preferred embodiment, target information system 12 includes one or more databases, including structured query language (SQL) databases, that organize the real-time and historical radar track data 14, 15 in a manner that facilities rapid queries over long periods of time at least on the order of several hours or days, in support of the required fast turn-around time for generating corroborating radar data 17 in response to target incident data 16. This fast turn-around time is essential, especially for the case of an overdue incident with stale LKP, so that radar information can inform and improve the resulting search design 18 and SRU direction 19. See U.S. Pat. Nos. 10,101,437 and 9,291,707 B2 (FIG. 4) which are incorporated herein by reference for target information system 12 designs that are included in accordance with the present invention.

Radar sensors and radar networks 11 can be any type of 2D and/or 3D radar that generates radar tracks of uncooperative targets including small recreational vessels and/or drones or general aviation aircraft, and provides "raw" radar data in real-time as vessel tracks 14 and/or aircraft tracks 15 to target information system 12. Typical radar track update rates are on the order of a few seconds or less, allowing for good tracking of small uncooperative targets. See U.S. Pat. No. 7,940,206 B2 and U.S. Pat. No. 8,860,602 B2 which are incorporated herein by reference for examples of radar networks and see U.S. Pat. No. 9,291,707 B2 which is incorporated herein by reference for examples of 3D avian radars which are included in the types of radars 11 that are contemplated in accordance with this invention.

Figure 2:
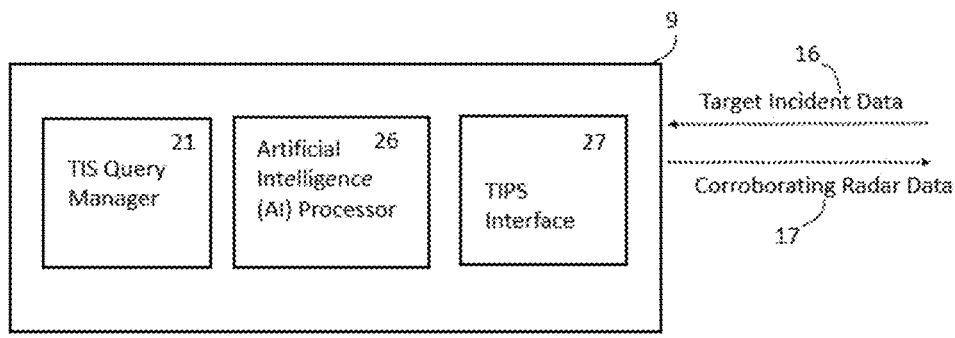
FIG. 2 is a block diagram of a preferred embodiment of the target incident processing system of FIG. 1, in accordance with this invention.

A block diagram of a preferred embodiment of TIPS 9 in accordance with the present invention is shown FIG. 2. This preferred embodiment can use either a human-to-machine interface or a machine-to-machine (M2M) interface between SAR mission planning system 13 and TIPS 9. Furthermore, FIG. 2 illustrates the preferred use of artificial intelligence (AI) processor 26 as a means to providing a fast and sophisticated data processor that incorporates all of the intelligence needed to process target incident data 16 to generate corroborating radar data 17. AI processor 26 is operatively connected to TIPS interface 27 and TIS query manager 21. TIPS interface 27 is responsible for the interface associated with target incident data 16. TIPS interface 27 receives, deciphers and translates target incident data 16 and delivers from it the information required by AI processor 26. TIS query manager 21 provides the interface between AI processor 26 and TIS 12. AI processor 26 specifies the multiple TIS queries to TIS query manager 21 and receives therefrom the associated or queried raw track data extracted by TIS 12, analyzes and processes the received track data using various algorithms known to those skilled in the art including the algorithms described herein such as AI algorithms, forming corroborating radar data 17, and provides the corroborating radar data 17 to TIPS interface 27.

Figure 3:
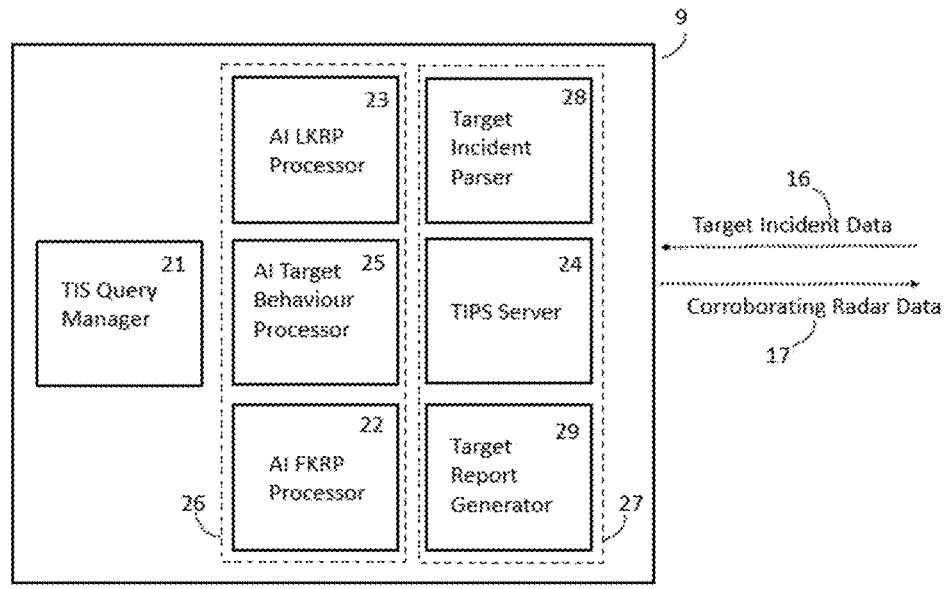
FIG. 3 is a block diagram of another preferred embodiment of the target incident processing system in accordance with this invention.

FIG. 3 illustrates another preferred embodiment of TIPS 9 in accordance with this invention. In this embodiment, TIPS interface 27 preferably consists of target incident parser 28, TIPS server 24 and target report generator 29. TIPS server 24 acts as the interface to the outside world receiving target incident data 16 and sending out corroborating radar data 17. Target incident data 16 received by TIPS server 24 is parsed by target incident parser 28 to provide AI processor 26 with the target incident information it requires. Target report generator 29 packages the corroborating radar data 17 generated by AI processor 26 and delivers the same to ITS server 24 for outside distribution.

In this embodiment, AI LKRP processor 26 preferably consists of AI LKRP processor 23 for determining LKRPs, AI FKRP processor 22 for determining FKRPs, and AI target behaviour processor 25 for assessing target behavior and determining consistency with target incident data 17. For a given SAR scenario, any of these processors may be operative acting independently or working together, each with the ability to query TIS Query Manager 21 and mining and/or process raw track data provided thereby.

This embodiment allows expert knowledge to be learned and maintained within each AI processors 22, 23 and 25. In addition, this architecture allows TIS query manager 21 to provide a generic interface to TIS 12 while having tailored interfaces respectively to each of AI processors 22, 23 and 25. The benefit of this approach is that general purpose radar sensors and networks 11 and target information systems 12 owned and operated by third parties (i.e. not the SAR mission planning system 13 owner) can be made readily available to integrate with TIPS 9 and SAR mission planning systems 13 without a complete re-design.

Figure 4:
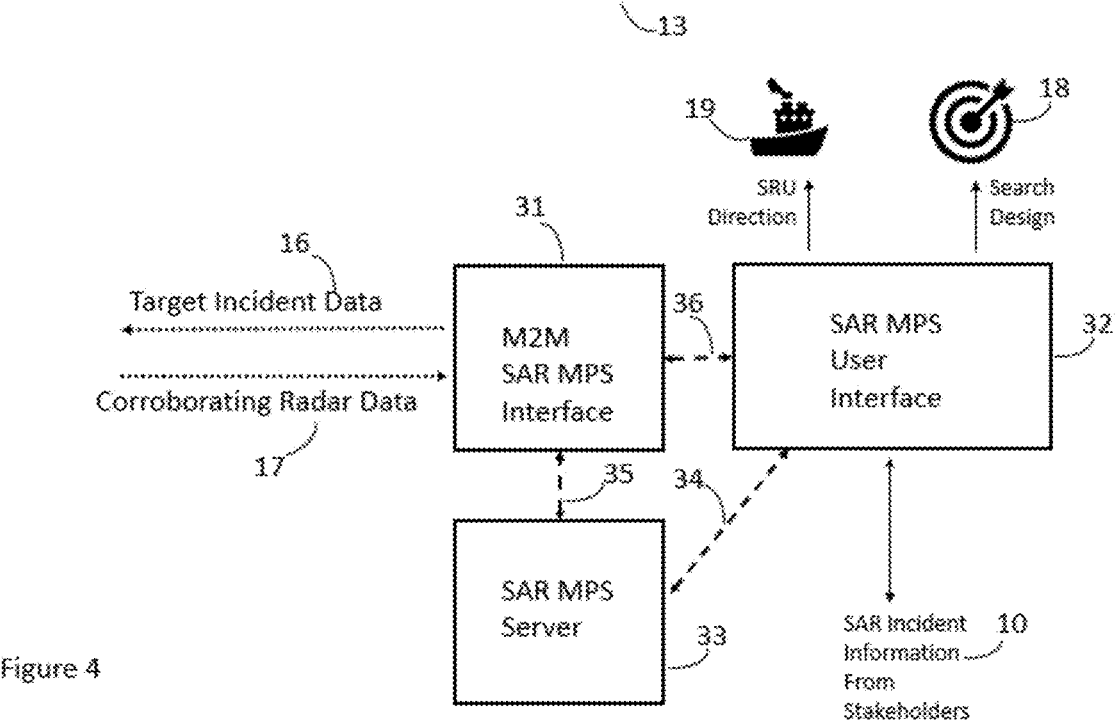
FIG. 4 is a block diagram of a preferred embodiment of a SAR mission planning system in accordance with this invention.

A block diagram of a preferred embodiment of SAR mission planning system 13 in accordance with the present invention is shown FIG. 4. This embodiment provides a machine-to-machine interface between SAR mission planning system 13 and TIPS 9. This allows SAR coordinators and professionals to interact with their SAR mission planning system 13 in the usual way, through SAR MPS user interface 32, without requiring any direct knowledge or interaction with TIPS 9. SAR MPS user interface 32 supports the required interactions in obtaining SAR incident information from stakeholders 10 and communicating search design 18 and SRU direction 19 information. These data are typically maintained in the system databases (not shown) that are typically associated with SAR mission planning system 13 and updated and accessed through requests made to SAR MPS Server 33 using SAR MPS user interface 32 or directly by M2M SAR MPS interface 31. The SAR coordinator, through a key stroke or mouse click or the submission of an electronic form using SAR MPS user interface 32, can request corroborating radar data 17 from TIPS 9. This request may also or alternatively occur automatically when sufficient information is available in the SAR mission planning system 13. Upon request to SAR MPS server 33, or alternatively through a direct interface 36, M2M SAR MPS interface 31 prepares and sends target incident data 16 to TIPS 9. M2M SAR MPS interface 31 captures the expert knowledge of the SAR coordinator and professionals and ensures that target incident data 16 is formatted appropriately with the information required by TIPS 9. M2M SAR MPS interface 31 interacts with SAR MPS server 33 to access any required SAR incident information 10 for use in generating target incident data 16. Upon receipt of corroborating radar data 17, M2M SAR MPS interface 31 interacts with SAR MPS server 33 to file the received corroborating radar data 17 and to alert the SAR coordinator, via SAR MPS user interface 19, of its availability. Alternatively, M2M SAR MPS interface 31 may communicate directly with SAR MPS user interface 32.

Key benefits of this embodiment are that it assures the regularity and standardization of target incident data 16, results in faster turn-around time, and requires less training and SAR coordinator time, especially given that it may all implement automatically when sufficient information is available to generate target incident data 16. Furthermore, corroborating radar data 17 may be automatically presented to the SAR coordinator for review and acceptance, resulting in the enclosed (selected) information such as LKRPs and FKRPs being fed directly into the DATUM, and search area calculations.

Figure 5:
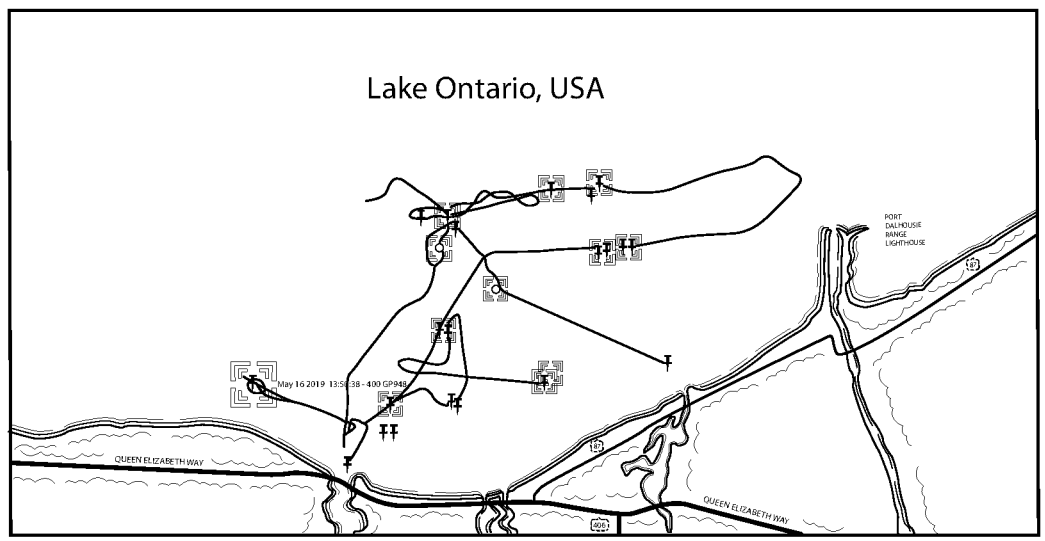
FIG. 5 is a pictorial representation of corroborating radar data in accordance with this invention.
Figure 6:
FIG. 6 illustrates a set of vessel tracks that were automatically mined by a smart radar corroboration system in accordance present invention in order to generate the corroborating radar data shown in FIG. 5.

A pictorial representation of a corroborating radar data 17 in accordance with this invention is illustrated in FIG. 5. This figure has been described earlier and illustrates an overdue incident where candidate radar trajectories and LKRPs where produced by TIPS 9. This same information may be provided in corroborating radar data 17 using various numerical, vector and image formats known to those skilled in the art.

Particular features of our invention have been described herein. However, simple variations and extensions known to those skilled in the art are certainly within the scope and spirit of the present invention. This includes variations on integration of the functional blocks described herein. For instance, FIG. 3 shows AI LKRP processor 23 and AI FKRP processor 22 as two separate processing components. It is obvious that these two components can be combined into a single component, or into more than two components, with complete flexibility on where the boundaries lie.

Data flows 8, 10, 14, 15, 16, 17, 18, and 19 can be implemented using all standard methods and messaging formats and protocols known to those skilled in the art. Software and user interfaces 31 and 32 can be implemented using any software implementation including thin and thick applications, mobile applications, Web services and browser applications, et cetera. Servers 24 and 33 can be implemented using all known server implementations including stand-alone Windows™ or Linux servers, virtual servers, cloud servers, et cetera. And processors 9, 22, 23, 25, and 26 can be implemented using all known technologies including general purpose computing, embedded computing, digital signal processors and chip sets, cloud services, et cetera.

What is claimed is:

1. A smart radar data mining and target location corroboration system for supporting search and response personnel in responding to high-risk safety or security incidents involving an uncooperative vessel or aircraft, comprising:
   a. a target incident processing sub-system configured to receive target incident data concerning an uncooperative target where said target incident data includes target location information that is stale in time or unknown, said target incident processing sub-system being further configured to rapidly and automatically mine large volumes of historical radar track data to extract corroborating radar data pertinent to said target incident data, said corroborating radar data collected at least ten minutes prior to receipt of said target incident data by said target incident processing sub-system; and
   b. a target information sub-system configured to receive continuously in real-time radar track data for targets in a region of coverage where safety or security incidents occur and store said track data in a database in real-time so that said radar track data can be accessed, queried and further processed by an operatively connected data processor, said targets including uncooperative targets,
   c. said target incident processing sub-system being operatively connected to said target information sub-system and further configured to automatically define one or more queries in relation to said target incident data and send said one or more queries to said target information sub-system in response to said target incident data,
   d. said target information sub-system being further configured to receive said one or more queries and to generate corresponding queried radar track data and send said queried radar track data to said target incident processing sub-system in response to each of said one or more queries, said queried radar track data containing relevant track data from said target information sub-system that is consistent with said one or more queries, said queried radar track data including track data from said target information sub-system received by said target information sub-system in real-time up to and including a time of receipt of said one or more queries,
   e. said target incident processing sub-system further configured to receive said queried radar track data and process said queried radar track data to generate said corroborating radar data, said corroborating radar data being probabilistically associated with said target incident data so as to support, enhance, update, clarify, or correct said target incident data, and to return said corroborating radar data in response to said target incident data, said corroborating radar data including track data from said target information sub-system received by said target information sub-system in real-time up to and including a time of receipt of said one or more queries by said target information sub-system.

2. The system of claim 1 wherein said uncooperative targets are taken from the group consisting of (i) watercraft that do not report their true position to a relevant authority continuously at least once per minute, including recreational boats and pleasure craft of all kinds, commercial vessels, research vessels, and autonomous vessels; (ii) watercraft whose identity is unknown to the relevant authorities; (iii) aircraft that do not report their true position to a relevant authority continuously at least once per minute, including general aviation aircraft, unmanned or remotely piloted aircraft systems including recreational and commercial drones, and autonomous aircraft; and (iv) aircraft whose identity is unknown to the relevant authorities.

3. The system of claim 1 wherein said corroborating radar data includes one or more items taken from the group consisting of (i) at least one radar target track that includes multiple position updates versus time, (ii) at least one last known radar position and corresponding time, and (iii) at least one first known radar position and corresponding time.

4. The system of claim 1 wherein said target incident data is stale in describing an incident with a last known position that occurred much earlier than the time of receipt of said target incident data by said target incident processing sub-system.

5. The system of claim 1 wherein said target incident data describes an incident involving a target whose origin is unknown or which has no first known position.

6. The system of claim 1 wherein said real-time radar track data is received from a radar network containing at least one radar sensor, said radar sensor being taken from the group consisting of (i) radars generating 2D track data including positions represented as latitude/longitude pairs versus time, (ii) radars generating 2D track data including positions represented as range/altitude pairs versus time, and (iii) radars generating 3D track data including positions represented as latitude/longitude/altitude triplets versus time.

7. The system of claim 1 wherein said target incident processing sub-system receives said target incident data and returns said corroborating radar data through the use of a service desk, said service desk providing data exchanges using a human-to-human interface between an incident coordinator and an operator of said target incident processing sub-system, said human-to-human interface using at least one communication channel taken from the group consisting of audio telephone communication, e-mail communication, and human interaction with a web page or software application.

8. The system of claim 1 wherein said target incident processing sub-system receives said target incident data and returns said corroborating radar data via a human-to-machine interface between an incident coordinator and said target incident processing sub-system, said human-to-machine interface being configured with a web page or software application to receive said target incident data from said incident coordinator and to return said corroborating radar data to said incident coordinator.

9. The system of claim 1 wherein said target incident processing sub-system receives said target incident data and returns said corroborating radar data through the use of a machine-to-machine interface, said machine-to-machine interface providing data exchanges between (i) a software interface associated with a mission planning system that communicates through a user interface with an operator of said mission planning system and (ii) a software interface associated with said target incident processing sub-system.

10. The system of claim 9 wherein the operative connection between the machines of said machine-to-machine interface is provided using a communication channel taken from the group consisting of {a local area network, a wide-area network, a wireless connection such as a cellular connection, WiFi connection, radio or satellite communication connection, and an Internet connection}.

11. The system of claim 1 wherein said target incident processing sub-system includes an artificial intelligence processor that uses the information from said target incident data and said radar track data provided by said target information sub-system to find candidate tracks as well as last known radar position or first known radar position for inclusion in said corroborating radar data, wherein said artificial intelligence processor is configured to automatically learn from past experience.

12. The system of claim 11 wherein said artificial intelligence processor is configured to find said candidate tracks in part by using automatic target behavior recognition algorithms taken from the group consisting of target departure behavior algorithms, target enroute behavior algorithms, and target type behavior algorithms.

13. The system of claim 12 wherein said target type behavior algorithms in part include pattern recognition for matching camera snapshots associated with said candidate tracks with the type of target specified in said target incident data.

14. The system of claim 11 wherein said artificial intelligence processor is configured with track stitching algorithms to automatically determine causal sequences of broken tracks from said radar track data and further configured to associate and join said sequences to generate said candidate tracks.

15. The system of claim 14 wherein said target incident processing sub-system is configured to automatically adjust said one or more queries to said target information sub-system in response to results of use of said track stitching algorithms by said artificial intelligence processor.

16. The system of claim 1 wherein said target incident data includes the approximate last known position and associated time of a vessel that has been reported overdue, the reporting of said vessel as being overdue occurring at least one hour after said associated time.

17. The system of claim 1 wherein said corroborating radar data includes real-time track updates from a target of interest potentially associated with said target incident data.

18. The system of claim 1 wherein said corroborating radar data is configured for use in real-time by a display device carried by said search and response personnel to provide thereto timely updates as generated by said target incident processing sub-system.

19. A smart radar data mining and target location corroboration method for supporting search and response personnel in responding to high-risk safety or security incidents involving an uncooperative vessel or aircraft, comprising:
  a. operating a target incident processing system to receive target incident data concerning an uncooperative target wherein said target incident data includes target location information that is stale in time or unknown, said target incident processing system being configured to cooperate with a target information system to rapidly mine large volumes of historical radar track data to extract corroborating radar data pertinent to said target incident data, said corroborating radar data collected at least ten minutes prior to receiving said target incident data; and
  b. controlling the target information system to receive continuously in real-time radar track data for targets in a region of coverage wherein safety or security incidents occur and to store said track data in a database in real-time so that said radar track data can be accessed, queried and further processed by an operatively connected data-processing system, said targets including uncooperative targets,
  c. further operating said target incident processing system to define one or more queries in relation to said target incident data and send said one or more queries to said target information system in response to said target incident data, d. further controlling said target information system to receive said one or more queries, generate corresponding queried radar track data, and send said queried radar track data to said target incident processing system in response to each of said one or more queries, said queried radar track data containing relevant track data from said target information system that are consistent with said one or more queries, said queried radar track data further including track data from said target information sub-system received by said target information system in real-time up to and including a time of receipt of said one or more queries, e. additionally operating said target incident processing system to further receive said queried radar track data and process said queried radar track data to generate said corroborating radar data, said corroborating radar data being probabilistically associated with said target incident data so as to support, enhance, update, clarify, or correct said target incident data, and return said corroborating radar data in response to said target incident data, said corroborating radar data including track data from said target information sub-system received by said target information sub-system in real-time up to and including a time of receipt of said one or more queries by said target information sub-system.

20. The method of claim 19 wherein said uncooperative targets are taken from the group consisting of (i) watercraft that do not report their true position to a relevant authority continuously at least once per minute, including recreational boats and pleasure craft of all kinds, commercial vessels, research vessels, and autonomous vessels; (ii) watercraft whose identity is unknown to the relevant authorities; (iii) aircraft that do not report their true position to a relevant authority continuously at least once per minute, including general aviation aircraft, unmanned or remotely piloted aircraft systems including recreational and commercial drones, and autonomous aircraft; and (iv) aircraft whose identity is unknown to the relevant authorities.

21. The method of claim 19 wherein said corroborating radar data includes one or more items taken from the group consisting of (i) at least one radar target track that includes multiple position updates versus time, (ii) at least one last known radar position and corresponding time, and (iii) at least one first known radar position and corresponding time.

22. The method of claim 19 wherein said target incident data is stale in describing an incident with a last known position that occurred much earlier than a time of receipt of said target incident data by said target incident processing sub-system.

23. The method of claim 19 wherein said target incident data describes an incident involving a target whose origin is unknown or which has no first known position.

24. The method of claim 19 wherein said real-time radar track data is received from a radar network containing at least one radar sensor, said radar sensor being taken from the group consisting of (i) radars generating 2D track data including positions represented as latitude/longitude pairs versus time, (ii) radars generating 2D track data including positions represented as range/altitude pairs versus time, and (iii) radars generating 3D track data including positions represented as latitude/longitude/altitude triplets versus time.

25. The method of claim 19, further comprising operating a human-to-human interface to convey information between an incident coordinator and an operator of said target incident processing sub-system, the operating of said human-to-human interface including transmitting via at least one communication channel taken from the group consisting of audio telephone communication, e-mail communication, and human interaction with a web page or software application.

26. The method of claim 19, further comprising operating a human-to-human interface to convey information between an incident coordinator and an operator of said target incident processing sub system, the operating of said human-to-human interface including using a web page or software application to receive said target incident data from said incident coordinator and to return said corroborating radar data to said incident coordinator.

27. The method of claim 19, further comprising operating a machine-to-machine interface to provide data exchanges between (i) a software interface associated with a mission planning system that communicates through a user interface with an operator of said mission planning system and (ii) a software interface associated with said target incident processing sub-system.

28. The method of claim 19 wherein the operating of said target incident processing sub-system includes operating an artificial intelligence processor to use the information from said target incident data and said radar track data from said target information sub-system to find candidate tracks as well as last known radar position or first known radar position for inclusion in said corroborating radar data, wherein the operating of the artificial intelligence processor includes automatically learning from past experience.

29. The method of claim 28 wherein the operating of said artificial intelligence processor to find said candidate tracks includes operating said artificial intelligence processor in part to use automatic target behavior recognition algorithms taken from the group consisting of target departure behavior algorithms, target enroute behavior algorithms, and target type behavior algorithms.

30. The method of claim 29 wherein said target type behavior algorithms in part include pattern recognition for matching camera snapshots associated with said candidate tracks with the type of target specified in said target incident data.

31. The method of claim 28 wherein the operating of said artificial intelligence processor includes operating same to use stitching algorithms to automatically determine causal sequences of broken tracks from said radar track data and further configured to associate and join said sequences to generate said candidate tracks.

32. The method of claim 31 wherein the operating of said target incident processing sub-system includes operating same to automatically adjust said one or more queries to said target information sub-system in response to results of use of said track stitching algorithms by said artificial intelligence processor.

33. The method of claim 19 wherein said target incident data includes the approximate last known position and associated time of a vessel that has been reported overdue, the reporting of said vessel as being overdue occurring at least one hour after said associated time.

34. The method of claim 19 wherein said corroborating radar data includes real-time track updates from a target of interest potentially associated with said target incident data.

35. The method of claim 19 wherein said corroborating radar data is configured for use in real-time by a display device carried by said search and response personnel to provide thereto timely updates as generated by said target incident processing sub-system.

36. A smart radar data mining and target location corroboration method for supporting search and response personnel in responding to high-risk safety or security incidents involving an uncooperative vessel or aircraft, comprising:
   a. receiving a human report about a safety or security incident involving an uncooperative target whose last known position was at a time at least one hour before the time of receiving said human report, and generating target incident data from said report;
   b. providing said target incident data to an automatic radar service available through at least one method taken from the group consisting of Web portal, Web site, service desk, Web Services;
   c. upon receipt of said target incident data, operating said automatic radar service to automatically convert said target incident data into machine readable queries or guidelines and to automatically mine a radar track database pursuant to said queries or instructions from the time of said last known position of said uncooperative target to a present time to uncover corroborating radar data that provides more current location information taken from the group of (i) target trajectories containing location versus time data points, (ii) last known radar position and corresponding time, and (iii) first known radar position and corresponding time that are probabilistically associated with said uncooperative target, said corroborating radar data including track data from said radar track database received by said radar track database in real-time up to and including a time of receipt of said human report;
   d. further operating said automatic radar service to return said corroborating radar data uncovered in response to said provided target incident data; and
   e. using said corroborating radar data to assist in performing an action taken from the group consisting of (a) corroborating target incident data, (b) assessing incident risk, (c) calculating a DATUM, (d) designing a search area for said incident, and (e) developing guidance to direct response.

37. The method of claim 36 wherein operating said automatic radar service includes an artificial intelligence processing in the mining of said radar track database, wherein said artificial intelligence processing includes automatically learning from past experience.

38. The method in claim 37 wherein said artificial intelligence processing includes using automatic target behavior recognition algorithms taken from the group consisting of target departure behavior algorithms, target enroute behavior algorithms, and target type behavior algorithms.

* * * * *